US012685980B1

(12) United States Patent
Zheng et al.

(10) Patent No.: US 12,685,980 B1
(45) Date of Patent: Jul. 21, 2026

(54) MIXING MECHANISM, MIXING DEVICE, AND MIXING METHOD

(71) Applicants: Guangdong Sophon Intelligent Technology Co., Ltd, Dongguan (CN); SOPHON TECHNOLOGY USA INC., Okemos, MI (US)

(72) Inventors: Chunyang Zheng, Dongguan (CN); Hao Zhou, Dongguan (CN); Linbo Li, Dongguan (CN); Dechao Liang, Dongguan (CN)

(73) Assignees: GUANGDONG SOPHON INTELLIGENT TECHNOLOGY CO., LTD, Dongguan (CN); SOPHON TECHNOLOGY USA INC., Okemos, MI (US)

( * ) Notice: Subject to any disclaimer, the term of this patent is extended or adjusted under 35 U.S.C. 154(b) by 0 days.

(21) Appl. No.: 19/318,459

(22) Filed: Sep. 4, 2025

(30) Foreign Application Priority Data

Apr. 16, 2025 (CN) ......................... 202510479120.2

(51) Int. Cl.

| | |
|---|---|
| ***B01F 33/83*** | (2022.01) |
| ***B01F 23/60*** | (2022.01) |
| ***B01F 29/80*** | (2022.01) |
| ***B01F 31/50*** | (2022.01) |
| ***B01F 31/60*** | (2022.01) |
| ***B01F 33/25*** | (2022.01) |
| ***B01F 35/42*** | (2022.01) |

(52) U.S. Cl.
CPC ............ *B01F 35/423* (2022.01); *B01F 29/80* (2022.01); *B01F 31/50* (2022.01); *B01F 33/251* (2022.01)

(58) Field of Classification Search
CPC ......... B01F 31/07; B01F 31/50; B01F 33/251
See application file for complete search history.

(56) References Cited

U.S. PATENT DOCUMENTS

| | | | | |
|---|---|---|---|---|
| 2019/0143284 | A1* | 5/2019 | Lee | C12M 41/32 435/298.1 |
| 2020/0108363 | A1* | 4/2020 | Riback | B01F 35/3204 |

FOREIGN PATENT DOCUMENTS

CN 205925956 U * 2/2017

OTHER PUBLICATIONS

Espacenet translation of Jie-Hao Pan (CN205925956U), publsihed Feb. 8, 2017 (Year: 2017).*

* cited by examiner

*Primary Examiner* — Elizabeth Insler
(74) *Attorney, Agent, or Firm* — Andrew C. Cheng

(57) ABSTRACT

The present invention discloses a mixing mechanism, a mixing device, and a mixing method. The mixing mechanism comprises a support plate, a stop support, a support platform, and a drive unit. A contact point exists between the drive unit and the support plate, and the contact point is offset from a center of the support plate; the drive unit includes an adjuster that acts on a position of the contact point in a first direction; the contact point has at least a first movement position in a first direction; and when the support plate is supported by the stop support in a natural state, a height difference exists between a height of the support plate and the first movement position. This enables the adjustment of the inclined angle to adapt to different powder material mixing requirements, significantly enhancing mixing efficiency of powder material.

8 Claims, 6 Drawing Sheets

MIXING MECHANISM, MIXING DEVICE, AND MIXING METHOD

FIELD OF THE INVENTION

The present invention relates to the technical field of powder material mixing, in particular to a mixing mechanism, a mixing device, and a mixing method.

DESCRIPTION OF THE RELATED ART

A mixing mechanism is a machine designed to facilitate the mixing of various powder materials, widely applied in industries including pharmaceuticals, food processing, chemical engineering, oil fields, petroleum refining, and nuclear materials for the mixing of powders, solid-liquid mixtures, and liquids. The high-frequency vibration mixing mechanism generates high-frequency vibrations (typically 50-200 Hz) through a vibration motor or electromagnetic drive system, utilizing vibrational energy to cause intense collisions and diffusion between powder particles, rapidly achieving uniform mixing.

However, different powders have different angles of repose. The angle of repose refers to the angle between the free surface and the horizontal plane when the free surface of a powder accumulation is in a state of equilibrium in a gravitational field. Differences in the angle of repose of different powders can affect mixing efficiency. For example, two powders with large differences in the angle of repose may exhibit stratification during mixing. Powders with good flowability (small angle of repose) may sink to the bottom, while powders with poor flowability (large angle of repose) remain on the top.

SUMMARY OF THE INVENTION

The object of the present invention is to address the issue of poor mixing fluidity caused by the angle of repose of powder materials in existing mixing mechanisms, and to provide a mixing mechanism, mixing device, and mixing method.

The technical solutions for achieving the aforementioned object includes the following:

A mixing mechanism, comprises a support plate, a stop support, a support platform, and a drive unit; the first end of the stop support is mounted on the support platform, the support plate is mounted on a second end of the stop support, and the support plate is arranged above the support platform;

the drive unit is mounted on the support platform, with an output end of the drive unit in movable engagement with the support plate; a contact point exists between the drive unit and the support plate, and the contact point is offset from a center of the support plate;

the drive unit includes an adjuster that acts on a position of the contact point in a first direction; the contact point has at least a first movement position in a first direction; and when the support plate is supported by the stop support in a natural state, a height difference exists between a height of the support plate and the first movement position.

In one embodiment, the drive unit comprises a drive component, a rotary shaft, a sliding shaft, and a joint component; the drive component is mounted on the support platform; a first end of the rotary shaft is connected to an output end of the drive component, a second end of the rotary shaft and the sliding shaft are sleeved with each other; a length direction of the rotary shaft intersects with a length direction of the sliding shaft;

the adjuster is provided with a first adjustment assembly mounted on the rotary shaft and engaged with the first end of the sliding shaft; the second end of the sliding shaft is movably connected to a first end of the joint component, a second end of the joint component is in rolling connection with the support plate; and in a second direction, the sliding shaft is slidably connected to the rotary shaft.

In one embodiment, the first adjustment assembly comprises a first adjustment rod, a moving block, and a support block, a first end of the moving block is sleeved outside and rotatably connected to the sliding shaft; in the second direction, the sliding shaft abuts against the moving block;

a first end of the support block is mounted on the rotary shaft; a second end of the support block is sleeved on the outside of the first adjustment rod; a first end of the first adjustment rod is slidably connected to the support block;

a second end of the moving block is sleeved on the outside of the first adjustment rod, and a second end of the first adjustment rod is threadedly connected to the moving block.

In one embodiment, the adjuster is provided with a second adjustment assembly; the second adjustment assembly comprises a second adjustment rod, a first connecting sleeve, and a second connecting sleeve; a first end of the first connecting sleeve is in rolling connection with the support plate, a first end of the second adjustment rod is movably connected to a second end of the first connecting sleeve, a second end of the second adjustment rod is threadedly connected to a first end of the second connecting sleeve, and a second end of the second connecting sleeve is mounted on the output end of the drive unit.

In one embodiment, the adjuster comprises a first adjustment assembly and a second adjustment assembly; the drive unit comprises a drive component, a sliding shaft, a rotary shaft, and a joint component; the drive component is mounted on a support platform, a first end of the rotary shaft is mounted on the output end of the drive component; a second end of the rotary shaft is sleeved with a first end of the sliding shaft; in a second direction, the sliding shaft is slidably connected to the rotary shaft;

a second end of the sliding shaft is movably engaged with a first end of the joint component; the first adjustment assembly is mounted on the rotary shaft and engages with the sliding shaft; a second end of the joint component is connected to a first end of the second adjustment assembly, and a second end of the second adjustment assembly is in rolling connection with the support plate.

In one embodiment, the mixing mechanism further comprises a guide rail, a sliding seat, a first pulley, and a second pulley; the guide rail is mounted on a lower surface of the support plate and extends circumferentially around the support plate;

the sliding seat is mounted on the second end of the joint component; the first pulley and the second pulley are mounted on the sliding seat; the guide rail is arranged between the first pulley and the second pulley, and is slidably connected to the first pulley and the second pulley respectively;

a connecting rod is fixedly disposed under the sliding seat; the drive unit has a sliding shaft and a joint component; a first end of the connecting rod is fixed to the joint component, and a second end of the sliding shaft is movably engaged with the joint component.

In one embodiment, the stop support comprises at least three springs, the three springs are arranged circumferentially around the support plate, two ends of each of the springs are respectively mounted to the support plate and the support platform, and the mounting points of the springs are offset from the center of the support plate.

The present invention also provides a mixing device, comprising a vibrator and a mixing mechanism as described above, wherein the vibrator is mounted on the support plate of the mixing mechanism and arranged near the center of the support plate.

In one embodiment, the mixing device comprises grinding balls and a container, the container is mounted on a vibrator, a sealed mixing chamber is formed inside the container, and the grinding balls are movably disposed within the mixing chamber.

The present invention also provides a mixing method for a mixing device, comprising the following steps:

step one, a support plate is movable in a vertical direction on a stop support The support plate can move up and down on the limit support.

step two a drive unit abuts against a side portion of the support plate; in a first direction, an adjuster adjusts a contact point to a first movement position, such that the support plate is in a non-natural state; and an output end of the drive unit drives a side of the support plate to move continuously, causing the contact point to perform a continuous rotational movement.

In some embodiments, the adjuster comprises a first adjustment assembly and a second adjustment assembly, and the mixing method further comprises the following steps:

the first adjustment assembly is used to adjust the sliding shaft in a second direction, and drive the contact point to move in the first direction to the first movement position;

the second adjustment assembly is used to adjust a sliding seat in the first direction, and drive the contact point in the first direction, so that the contact point moves from the first movement position to a second movement position; and when the support plate is supported by the stop support in a natural state, a first height difference exists between a height of the support plate and the first movement position, and a second height difference exists between the height of the support plate and the second movement position.

In some embodiments, by rotating a first adjustment rod, the first adjustment rod drives a moving block, thereby causing the sliding shaft to move linearly in the second direction, adjusting a positional relationship between the sliding shaft and the rotary shaft, and moving the contact point to the first movement position; and by rotating a second adjustment rod, the second adjustment rod drives a first connecting sleeve to move linearly in the first direction, thereby moving the contact point from the first movement position to the second movement position.

In some embodiments, the mixing method further comprises the following steps: a container filled with powder material is mounted on a vibrator, which is set on the support plate; and the vibrator is started, driving the container to move up and down, causing the powder material inside the container to mix through vertical and radial movement.

In some embodiments, the mixing method further comprises: grinding balls move up and down, radially, and at high speed, thereby impacting and crushing powder material within the container.

The technical solutions provided by the present invention have the following advantages and effects:

The contact point is at the first movement position, and the support plate is in an inclined state. When the support plate is inclined, the output end of the drive unit acts on the side portion of the support plate and moves circumferentially around the support plate. The circumferential side portion of the support plate is continuously pushed up, while the stop support has a certain limiting effect on the side portion of the support plate, preventing the support plate from coming out of the second end of the stop support.

When the previous contact point moves to the next contact point, the force exerted on the previous contact point by the output end of the driving component disappears. The previous contact point on the support plate resets due to its own weight, and the previous contact point completes one up-and-down movement. The output end of the driving component moves to the next contact point, and the next contact point also completes the up-and-down movement of the previous contact point. Therefore, under the continuous action of the driving component, the outer edge of the support plate exhibits a continuous and regular up-and-down shaking motion along the circumference of the support plate. During the shaking process, one side of the outer edge of the support plate is higher than the other side. The outer edge of the container follows the shaking of the outer edge of the support plate, and the powder material moves from the side of the container to the center of the container, realizing the radial movement of the powder within the container. The powder material on the side of the container continuously moves towards the center of the container, and the powder material mixes radially within the container.

The outer edge of the container exhibits an inclined shaking motion, but the position of the container in a top-down view does not shift. It achieves adjustment to adapt to the inclined angle of powder mixing, avoids the phenomenon of powder accumulation in the container during the mixing process, changes the traditional mixing movement mode of powder material in the container, and significantly improves the mixing efficiency of the powder material.

BRIEF DESCRIPTION OF THE DRAWINGS

The accompanying drawings herein illustrate specific examples of the technical solutions described in the present invention and, together with the specific embodiments, constitute a part of the specification for explaining the technical solutions, principles, and effects of the present invention.

Unless otherwise specified or defined, the same reference numerals in different figures represent the same or similar technical features, and different reference numerals may also be used to represent the same or similar technical features.

EXPLANATION OF REFERENCE NUMERALS

Figure 1:
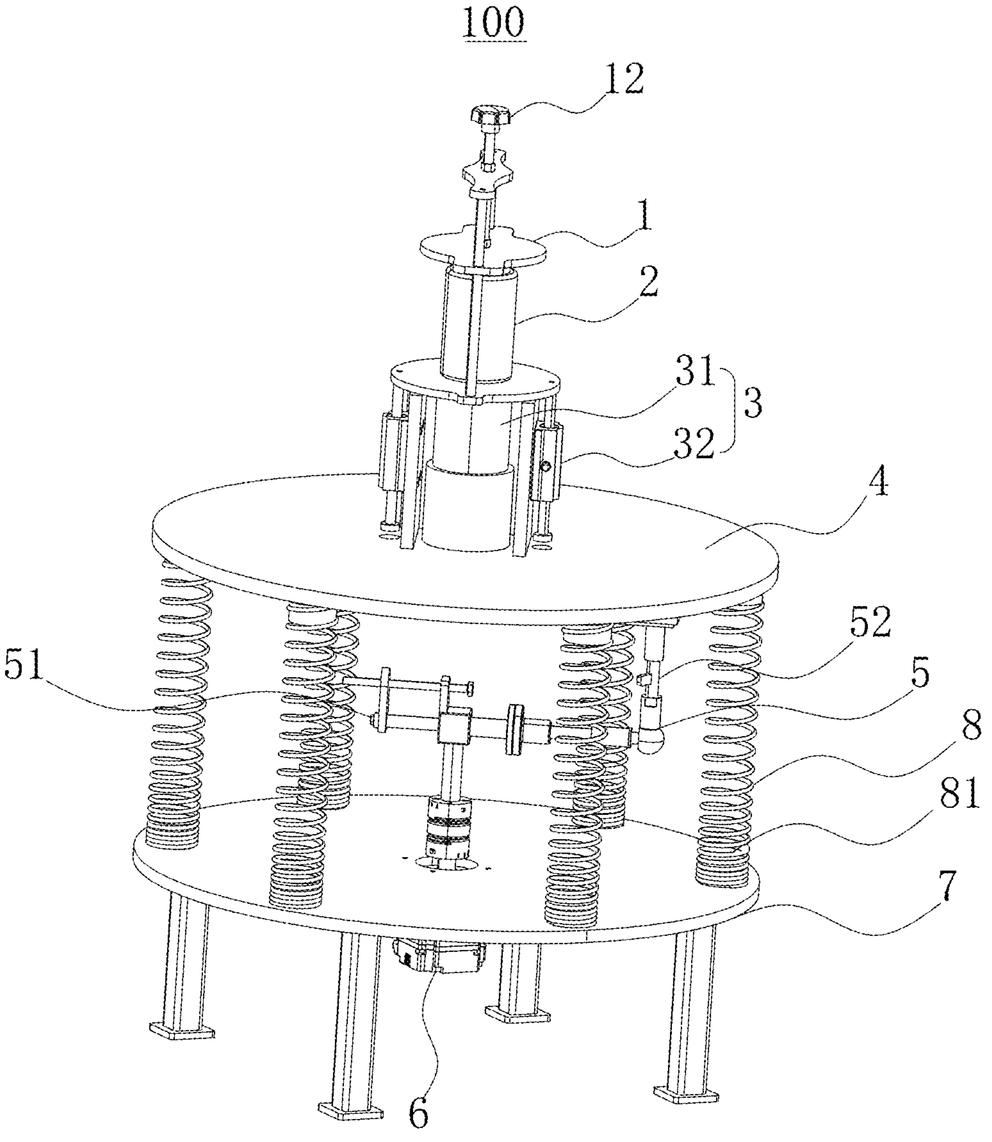
FIG. 1 is a schematic diagram of a mixing mechanism according to one embodiment of the present invention.
Figure 2:
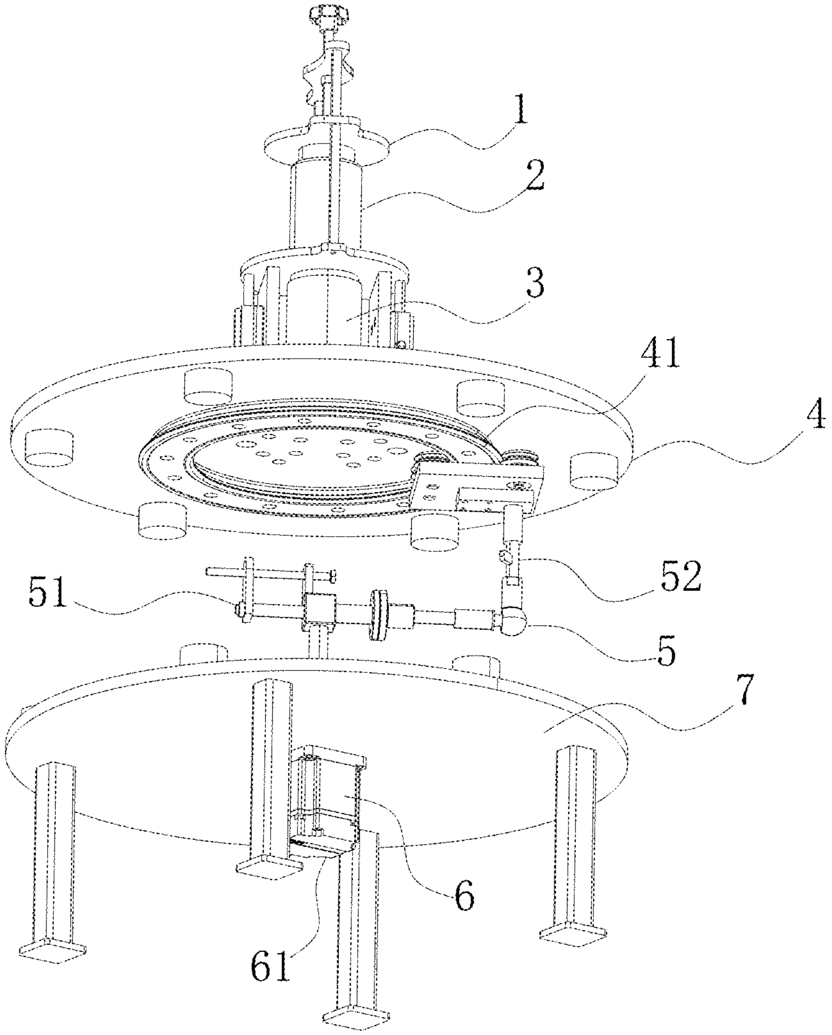
FIG. 2 is another schematic diagram of the mixing mechanism according to one embodiment of the present invention.
Figure 3:
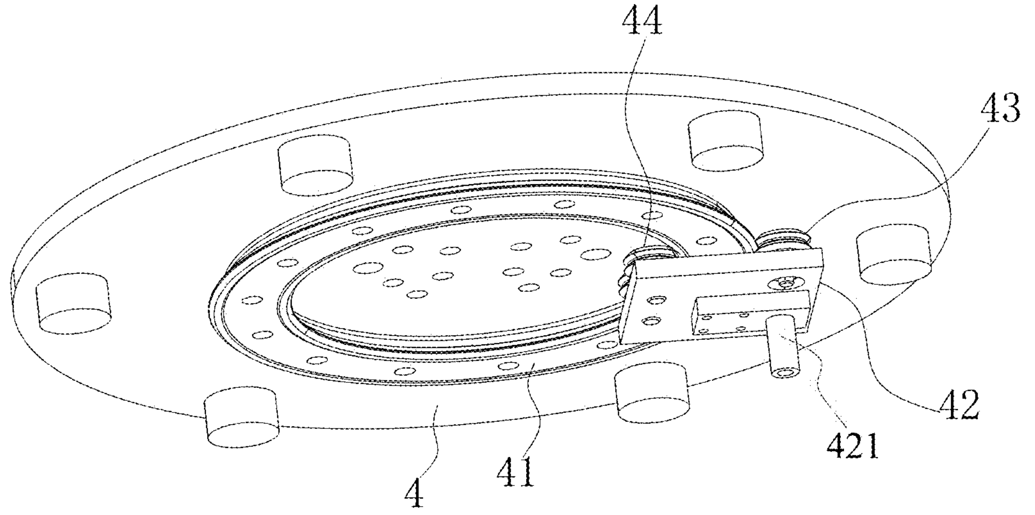
FIG. 3 is a bottom view of a support plate according to one embodiment of the present invention.

100. Mixing mechanism; 1. Clamping mechanism; 11. Support frame; 12. Clamping component; 121. Sealing plug; 122. Push rod; 2. Container; 21. Mixing chamber; 3. Vibrator; 31. Magnetic cylinder; 32. Second linear bearing; 33. Guide rod; 34. Moving plate; 4. Support plate; 41. Guide rail; 42. Sliding seat; 43. First pulley; 44. Second pulley; 50. Contact point; 5. Adjuster; 51. First adjustment assembly; 511. First adjustment rod; 512. Moving block; 513. Support block; 52. Second adjustment assembly; 521. First connecting sleeve; 522. Second connecting sleeve; 523. Second adjustment rod; 520. Joint component; 524. First connecting head; 525. Second connecting head; 53. Included angle; 54. adjustment range; 55. Horizontal line; 6. Drive unit; 61. Drive component; 62. Coupling; 63. Rotary shaft; 64. Sliding shaft; 65. Third linear bearing; 7. Support platform; 8. Stop support; 81. Spring; 9. Grinding ball.

DETAILED DESCRIPTION OF EMBODIMENTS

For a better understanding of the present invention, specific embodiments of the present invention will be described in more detail below with reference to the accompanying drawings.

Unless specifically stated or otherwise defined, the terms "first, second, . . . " used in this article are merely for distinguishing names and do not represent specific quantities or order.

It should be noted that when an element is considered to be "fixed to" another element, it can be directly fixed to the other element, or there can be a centering element; when an element is considered to be "connected to" another element, it can be directly connected to the other element, or there can be a centering element simultaneously; when an element is considered to be "mounted on" another element, it can be directly mounted on the other element, or there can be a centering element simultaneously. When an element is considered to be "arranged on" another element, it can be directly arranged on the other element, or there can be a centering element simultaneously.

The present invention provides a mixing mechanism 100, as shown in FIGS. 1 to 6, including a support plate 4, a stop support 8, a support platform 7, and a drive unit 6. A first end of the stop support 8 is mounted on the support platform 7, the support plate 4 is mounted on a second end of the stop support 8, and the support plate 4 is arranged above the support platform 7. The drive unit 6 is mounted on the support platform 7, an output end of the drive unit 6 is movably engaged with the support plate 4, the drive unit 6 and the support plate 4 have a contact point 50 therebetween, and the contact point 50 is offset from a center of the support plate 4. The drive unit 6 is provided with an adjuster 5, the adjuster 5 acts on a position of the contact point 50 in a first direction, and the contact point 50 has at least a first movement position in the first direction. When the support plate 4 is supported by the stop support 8 in a natural state, there is a height difference between a height of the support plate 4 and the first movement position.

In this embodiment, a container 2 containing powder material is mounted on the support plate 4, and the support plate 4 is movably engaged with the second end of the stop support 8. The specific installation method is not particularly limited here, but it is necessary to ensure that an outer peripheral portion of the support plate 4 has space for vertical movement on the stop support 8. The drive unit 6 is used to abut against a side portion of the support plate 4, so that a contact point 50 is formed between the drive unit 6 and the support plate 4. The force generated by the output end of the drive unit 6 can continuously act on a side of the support plate 4. The support plate 4 is horizontal or inclined when supported by the stop support 8 in the natural state. Furthermore, the adjuster 5 acts on the position of the contact point 50 in the first direction. When the contact point 50 moves to the first movement position in the first direction, the height of the support plate 4 and the first movement position have a height difference when the support plate 4 is supported by the stop support 8 in the natural state. Because a supporting position of the output end of the drive unit 6 deviates from the center of the support plate 4, the height of one side of the support plate 4 is significantly higher than the height of the other side. Therefore, at the first movement position of the contact point 50, the support plate 4 is in an inclined state.

Further, when the support plate 4 is inclined, the output end of the drive unit 6 acts on the side of the support plate 4 and moves circumferentially around the support plate 4. The circumferential side portion of the support plate 4 is continuously pushed up, while the stop support 8 has a certain limiting effect on the side portion of the support plate 4, preventing the support plate 4 from coming out of the second end of the stop support 8. When the previous contact point 50 moves to the next contact point 50, the force exerted by the output end of the drive unit 6 on the previous contact point 50 disappears, the previous contact point 50 on the support plate 4 resets due to its own weight, and the previous contact point 50 completes one up-and-down movement. The output end of the drive unit 6 moves to the next contact point 50, and the next contact point 50 also completes the up-and-down movement of the previous contact point 50. Therefore, under the continuous action of the drive unit 6, an outer edge of the support plate 4 shakes continuously and regularly along a circumferential direction of the support plate 4. During the shaking process, one side of the outer edge of the support plate 4 is higher than the other side, and the outer edge of the container 2 follows the shaking of the outer edge of the support plate 4. The powder material moves from the side of the container 2 to the center of the container 2, realizing the radial movement of the powder material within the container 2. The powder material on the side of the container 2 continuously moves towards the center of the container 2, realizing the radial mixing of the powder material in the container 2.

The outer edge of the container 2 exhibits an inclined shaking motion, but the position of the container 2 in a top-down view does not shift. It achieves adjustment to adapt to the inclined angle of powder material mixing, avoids the phenomenon of powder accumulation within the container 2 during the mixing process, changes the traditional mixing movement mode of the powder material within the container 2, and significantly improves the mixing efficiency of the powder.

In some embodiments, the drive unit 6 includes a drive component 61, a coupling 62, a rotary shaft 63, a sliding shaft 64, and a joint component 520. The drive component 61 is mounted on the support platform 7. The first end of the rotary shaft 63 is mounted on an output end of the drive component 61, and a second end of the rotary shaft 63 is sleeved with the sliding shaft 64, with a length direction of the rotary shaft 63 intersecting a length direction of the sliding shaft 64. The adjuster 5 is provided with a first adjustment assembly 51, which is mounted on the rotary shaft 63 and cooperates with a first end of the sliding shaft 64. A second end of the sliding shaft 64 is movably engaged with a first end of the joint component 520, and a second end of the joint component 520 is in rolling connection with the support plate 4. In the second direction, the sliding shaft 64 is slidably connected to the rotary shaft 63.

Specifically, the drive component 61 is fixedly disposed on the support platform 7, and the drive component 61 is used to drive the rotary shaft 63 to rotate. The rotary shaft 63 drives the sliding shaft 64 to rotate during the rotation process, and sequentially drives the joint component 520 to rotate. The second end of the joint component 520 is in rolling connection with the support plate 4, so that the joint component 520 has a moving path for circumferential rotation around the supporting plate 4. When the contact point 50 between the joint component 520 and the side of the support plate 4 is in the first movement position, the joint component 520 continuously lifts the side portion of the support plate 4. Under the action of the stop support 8, the side portion of the support plate 4 is reset by its own weight, so as to further realize the continuous and regular up and down shaking of the outer edge of the support plate 4 along the circumference of the support plate 4.

Figure 7:
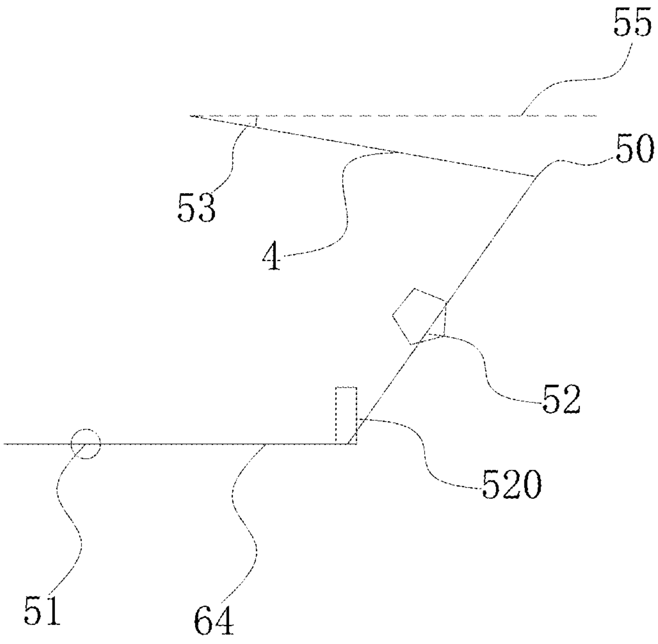
FIG. 7 is another schematic diagram of the adjustment range of the adjuster according to one embodiment of the present invention.
Figure 8:
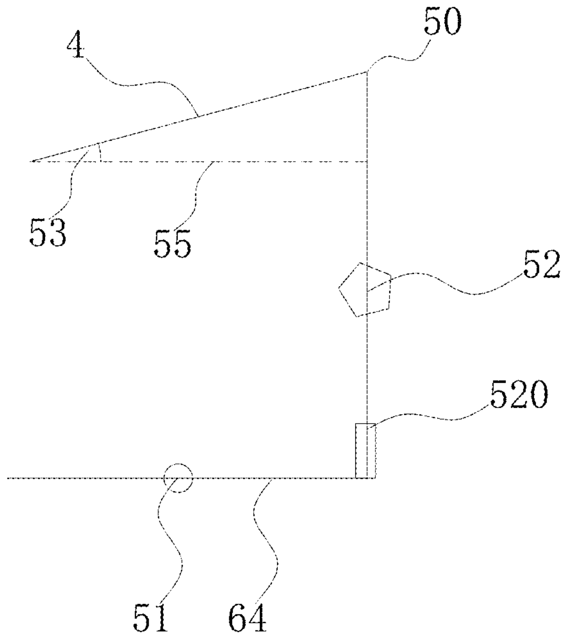
FIG. 8 is another schematic diagram of the adjustment range of the adjuster according to one embodiment of the present invention.
Figure 9:
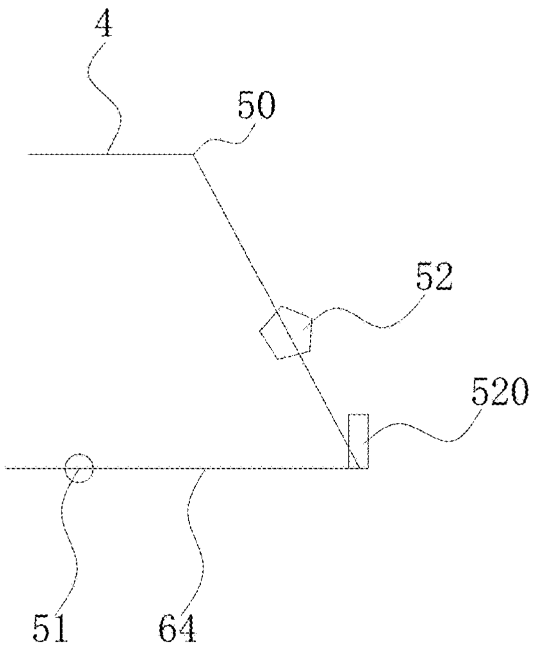
FIG. 9 is another schematic diagram of the adjustment range of the adjuster according to one embodiment of the present invention.

Further, since the rotary shaft 63 and the sliding shaft 64 are sleeved with each other, and the sliding shaft 64 is slidably connected to the rotary shaft 63, the joint component 520 is movably engaged with the sliding shaft 64, the first adjustment assembly 51 is engaged with the first end of the sliding shaft 64, and the first adjustment assembly 51 is used to adjust the positional relationship between the sliding shaft 64 and the rotary shaft 63, so as to adjust the position of the sliding shaft 64 in the second direction. In this embodiment, the first direction and the second direction intersect. As shown in FIGS. 7-9, when the first adjustment assembly 51 adjusts the sliding shaft 64 to move back and forth in the second direction, a section of the joint component 520 supporting the support plate 4 is inclined, the contact point 50 is in a lower position, and the side portion of the support plate 4 is inclined downward. When the first adjustment assembly 51 adjusts the sliding shaft 64 so that one end of the joint component 520 supporting the support plate 4 is in a vertical state, the contact point 50 is in a higher position, and the side portion of the support plate 4 is inclined upward. Therefore, in this embodiment, the first adjustment assembly 51 can also adjust the position of the contact point 50 acting in the first direction by adjusting the moving position of the sliding shaft 64 in the second direction, so that the contact point 50 can also be moved to the first movement position, thereby improving the flexibility of the position adjustment of the contact point 50 in the first direction.

Figure 4:
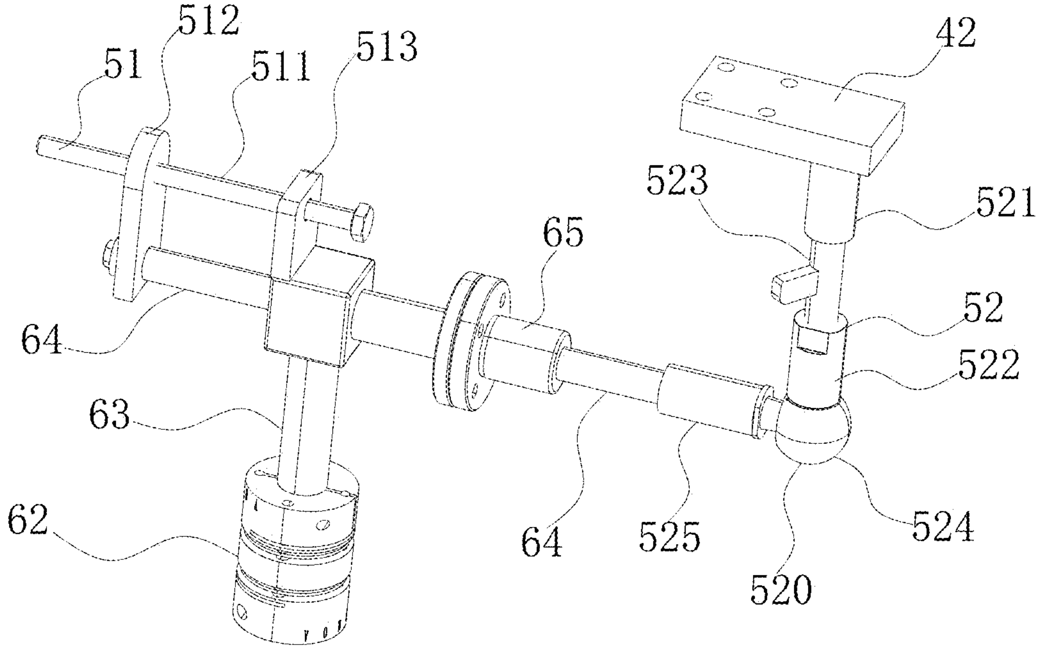
FIG. 4 is a schematic diagram of an adjuster according to one embodiment of the present invention.
Figure 5:
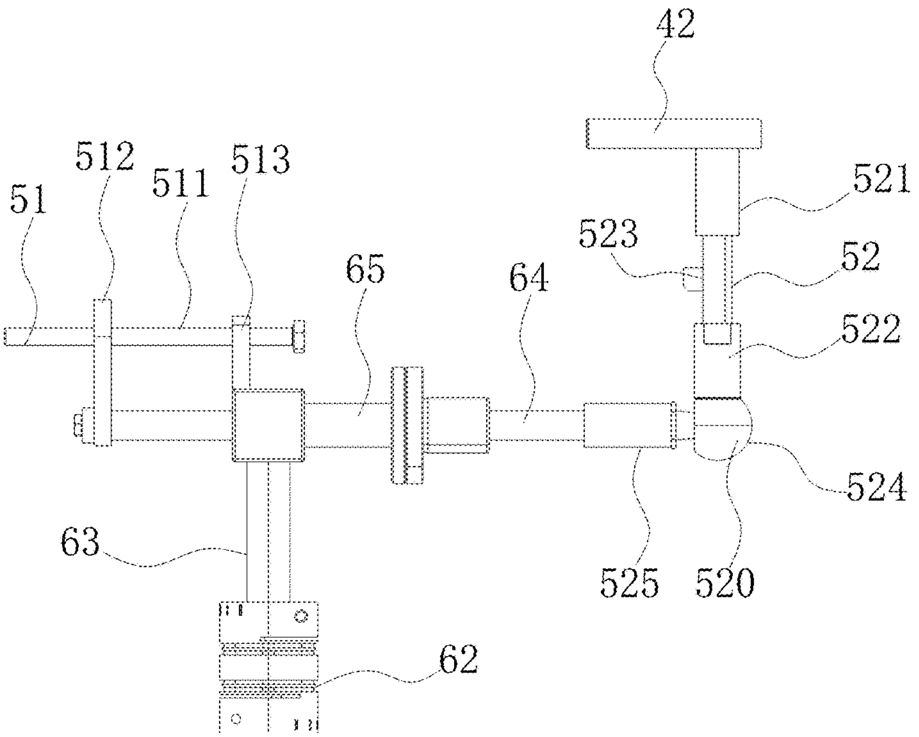
FIG. 5 is a front view of an adjuster according to one embodiment of the present invention.
Figure 6:
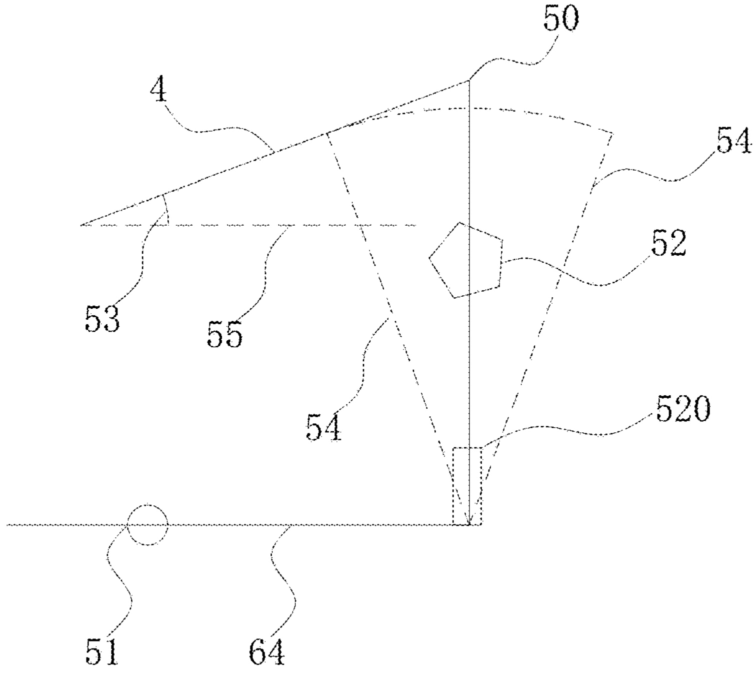
FIG. 6 is a schematic diagram illustrating an adjustment range of the adjuster according to one embodiment of the present invention.

Preferably, in order to further realize the adjustment of the sliding shaft 64 in the second direction by the first adjustment assembly 51, as shown in FIG. 4 and FIG. 5, the first adjustment assembly 51 includes a first adjustment rod 511, a moving block 512, and a support block 513. A first end of the moving block 512 is sleeved on the outside of the sliding shaft 64 and is rotatably connected to the sliding shaft 64; and in the second direction, the sliding shaft 64 abuts against the moving block 512. A first end of the support block 513 is mounted on the rotary shaft 63, and a second end of the support block 513 is sleeved on the outside of the first adjustment rod 511, and a first end of the first adjustment rod 511 is slidably connected to the support block 513. A second end of the moving block 512 is sleeved on the outside of the first adjustment rod 511, and a second end of the first adjustment rod 511 is threadedly connected to the moving block 512.

Specifically, by driving the first adjustment rod 511 to rotate, a threaded engagement occurs between the first adjustment rod 511 and the moving block 512. Since the first adjustment rod 511 is slidably connected to the support block 513, the first adjustment rod 511 is restricted by the support block 513. By rotating the first adjustment rod 511 in the forward or reverse direction, the first adjustment rod 511 drives the moving block 512 to move back and forth in the second direction. At the same time, the moving block 512 also drives the sliding shaft 64 to move back and forth in the second direction. When the driving of the first adjustment rod 511 to rotate is stopped, the first adjustment rod 511 is threadedly engaged with the moving block 512, and the first adjustment rod 511 can restrict the sliding shaft 64 from moving back and forth through the moving block 512, so that the sliding shaft 64 is stably and movably engaged with the joint component 520, realizing the adjustment of the position of the sliding shaft 64 in the second direction by the first adjustment assembly 51.

Preferably, the drive unit 6 further includes a third linear bearing 65, which is fixed on the rotary shaft 63 and sleeved outside the sliding shaft 64, such that the sliding shaft 64 is slidably connected to the rotary shaft 63 via the third linear bearing 65. Specifically, the third linear bearing 65 is used to reduce the friction between the sliding shaft 64 and the rotary shaft 63, and to improve the degree of freedom of the sliding shaft 64 in the second direction. By providing the third linear bearing 65, the first adjustment rod 511 will be smoother during adjusting the movement of the sliding shaft 64, improving the practicality of the first adjustment assembly 51.

In some embodiments, the adjuster 5 is further provided with a second adjustment assembly 52, which includes a second adjustment rod 523, a first connecting sleeve 521, and a second connecting sleeve 522. A first end of the first connecting sleeve 521 is in rolling connection with the support plate 4, a first end of the second adjustment rod 523 is movably connected to a second end of the first connecting sleeve 521, a second end of the second adjustment rod 523 is threadedly connected to the first end of the second connecting sleeve 522, and a second end of the second connecting sleeve 522 is mounted on the output end of the drive unit 6.

Specifically, the second adjustment rod 523 is movably connected to the first connecting sleeve 521 to prevent the first connecting sleeve 521 from being driven to rotate when the second adjustment rod 523 is rotated, ensuring that the contact point 50 between the first connecting sleeve 521 and the support plate 4 and the support plate 4 remains stable. By rotating the second adjustment rod 523 clockwise, the second adjustment rod 523 is threadedly engaged with the second connecting sleeve 522, thereby adjusting the distance between the second adjustment rod 523 and the second connecting sleeve 522, adjusting the length of the second adjustment assembly 52 in the first direction, and realizing that the second adjustment assembly 52 directly acts on the position of the contact point 50 in the first direction. In this embodiment, the positions of the first connecting sleeve 521 and the second connecting sleeve 522 are interchangeable, which is not particularly limited here.

In some embodiments, the adjuster 5 includes a first adjustment assembly 51 and a second adjustment assembly 52. The drive unit 6 includes a drive component 61, a sliding shaft 64, a rotary shaft 63, and a joint component 520. The drive component 61 is mounted on a support platform 7. A first end of the rotary shaft 63 is mounted on the output end of the drive component 61, and a second end of the rotary shaft 63 is sleeved with a first end of the sliding shaft 64. In the second direction, the sliding shaft 64 is slidably connected to the rotary shaft 63. A second end of the sliding shaft 64 is movably coupled with the first end of the joint component 520. The first adjustment assembly 51 is mounted on the rotary shaft 63 and cooperates with the sliding shaft 64. A second end of the joint component 520 is connected to a first end of the second adjustment assembly 52, and a second end of the second adjustment assembly 52 is in rolling connection with the support plate 4.

Specifically, in this embodiment, the first adjustment assembly 51 and the second adjustment assembly 52 are used together to adjust the position of the contact point 50 in the first direction, as shown in FIGS. 6-9. The first adjustment assembly 51 adjusts the position of the sliding shaft 64 in the second direction, which can indirectly adjust the position of the contact point 50 in the first direction. After the first adjustment assembly 51 adjusts the contact point 50 to its highest adjustable point, an included angle 53 is formed between the support plate 4 and a horizontal line 55. The second adjustment assembly 52 is used to continue adjusting the contact point 50, so that the contact point 50 is further adjusted, the side portion of the support plate 4 is further raised, and the included angle 53 between the support plate 4 and the horizontal line 55 becomes larger, increasing the inclination angle of the support plate 4. Therefore, the cooperation of the first adjustment assembly 51 and the second adjustment assembly 52 avoids being limited to the angular range of the joint component 520, and the adjustment range of the joint component 520 of the same angle is maximized under the action of the first adjustment assembly 51 and the second adjustment assembly 52.

In this embodiment, the specific structures of the first adjustment assembly 51 and the second adjustment assembly 52 can refer to other embodiments in this specification, and will not be repeated here.

Furthermore, assuming the adjustment angle of the joint component 520 is plus or minus 20°, the characteristics of different powder materials vary. The magnitude of the inclination angle is determined based on the angle of repose of the powder material. The angle of repose of conventional powder materials is between 20° and 45°. Through the cooperation of the first adjustment assembly 51 and the second adjustment assembly 52, an adjustment range 54 of the contact point 50 can be increased, so that the maximum angle of the mixing mechanism 100 can be adjusted to 40°, which can meet the mixing requirements of more than 85% of conventional powder materials.

In some embodiments, the mixing mechanism 100 further includes a guide rail 41, a sliding seat 42, a first pulley 43, and a second pulley 44. The guide rail 41 is mounted to a lower surface of the supporting plate 4 and extends circumferentially along the support plate 4. The sliding seat 42 is mounted to the second end of the joint component 520, and the first pulley 43 and the second pulley 44 are mounted on the sliding seat 42. The guide rail 41 is disposed between the first pulley 43 and the second pulley 44 and is in rolling connection with the first pulley 43 and the second pulley 44, respectively. A connecting rod 421 is fixedly arranged below the sliding seat 42. The drive unit 6 has a sliding shaft 64 and a joint component 520. The connecting rod 421 is fixed to the first end of the joint component 520, and the sliding shaft 64 is movably coupled to the second end of the joint component 520.

Specifically, in this embodiment, the connecting rod can be the second adjustment assembly 52. The connecting rod 421 is fixed to a lower end of the sliding seat 42, so that the connecting rod 421 and the sliding seat 42 are an integral structure. The connecting rod 421 is also fixed to the joint component 520. Therefore, in the first direction, the joint component 520 is fixed to the sliding seat 42 and drives the sliding seat 42 to move. When the sliding seat 42 moves, the first pulley 43 and the second pulley 44 on the sliding seat 42 roll and cooperate with inner and outer sides of the guide rail 41, reducing the friction between the sliding seat 42 and the guide rail 41. This reduces the power consumption of the drive unit 6 acting on the side portion of the support plate 4, and further enables the output end of the drive unit 6 to be movably coupled with the outer edge of the support plate 4.

In some embodiments, other methods may be used to achieve active cooperation between the sliding seat 42 and the support plate 4. For example, magnetic levitation propulsion, the working principle of which is mainly based on electromagnetic force and magnetic pole interaction. Specifically, magnetic levitation technology utilizes the force generated by an electromagnetic field to control the direction and intensity of the magnetic field, so that the magnetic fields between the object and the track have the same polarity, thereby generating a repulsive force that lifts the object and maintains it at a certain height, thus achieving active cooperation between the output end of the drive component 61 and the outer edge of the support plate 4.

In some embodiments, the stop support 8 includes six springs 81, the six springs 81 are arranged circumferentially around the support plate 4, two ends of each of the springs 81 are respectively mounted to the support plate 4 and the support platform 7, and the mounting point of each of the springs 81 is offset from the center of the support plate 4.

Specifically, an upper end of the spring 81 applies a restraining force to the side portion of the support plate 4, and the six springs 81 are arranged circumferentially around the support plate 4. Therefore, the support plate 4 has restraining forces at different positions in the circumferential direction. The restraining force is used to limit the moving distance of the support plate 4, and when the support plate 4 is pushed up by the output end of the drive unit 6, the spring 81 will generate a corresponding reaction force. When the previous contact point 50 moves to the next contact point 50, the spring 81 will act on the previous contact point 50, causing the side portion of the support plate 4 located at the previous contact point 50 to reset. The movement of the support plate 4 to the next contact point 50 will also cause the spring 81 to generate a corresponding reaction force. When the output end of the drive unit 6 continuously acts on the circumference of the support plate 4 and cooperates with the circumferential movement of the support plate 4, the outer edge of the support plate 4 exhibits a continuous and regular up-and-down shaking along the circumference of the support plate 4. In this embodiment, the stop support 8 is not limited to the springs 81.

In addition, the outer edge of the support plate 4 is fixed by the springs 81. The springs 81 are pulled or compressed to generate reaction forces. When the joint component 520 continuously rolls in the circumferential direction of the support plate 4, the outer edge of the support plate 4 is vibrated by the springs 81 at different positions. If the rotation speed of the sliding seat 42 is relatively high, the outer edge of the support plate 4 will continuously vibrate in the circumferential direction of the support plate 4, further increasing the vibration frequency of the container 2 on the support plate 4.

In another embodiment, the stop support 8 includes multiple support rods and multiple first linear bearings (not shown in the drawings). The multiple support rods are distributed around the support plate 4, with a first end of each support rod mounted to the support platform 7, and each of the first linear bearings sleeved on a second end of the support rod. In the first direction, the support plate 4 is slidably connected to the support rod through the first linear bearings, and the second end of the support rod has a limit portion abutting the top of the support plate 4. Specifically, the friction force of the movable fit between the support plate 4 and the support rod is reduced by the first linear bearings. When the side portion of the support plate 4 is lifted by the output end of the drive unit 6, the previous contact point 50 moves to the next contact point 50, and the side portion of the support plate 4 is reset by its own weight. The outer edge of the support plate 4 can also continuously and regularly shake up and down along the circumference of the support plate 4.

In some embodiments, the joint component 520 includes a first connecting head 524 and a second connecting head 525, the first connecting head 524 defining a moving slot. At least a portion of the second connecting head 525 is disposed within the moving slot, and the outer wall of the second connecting head 525 is rotatably connected to the inner wall of the moving slot. Specifically, the second connecting head 525 moves in the moving slot of the first connecting head 524, realizing active cooperation between the first connecting head 524 and the second connecting head 525. In addition, the joint component 520 may also be a universal joint structure, etc., which is not particularly limited here.

The present invention also provides a mixing device, including a vibrator 3 and a mixing mechanism 100 as described above, the vibrator 3 being mounted on the support plate 4 of the mixing mechanism 100 and arranged close to the center of the support plate 4. Specifically, a container 2 containing powder material is mounted on the vibrator 3, the vibrator 3 is arranged on the support plate 4, and the vibrator 3 drives the powder material in the container 2 to move up and down to mix the powder material, while the drive unit 6 abuts against the side portion of the support plate 4, and under the action of the stop support 8, the powder material on the side of the container 2 on the support plate 4 continuously moves towards the center of the container 2. It realizes the movement of the powder material in the radial and axial directions of the container 2, and greatly improves the mixing efficiency of the powder material through two completely different mixing methods.

Figure 10:
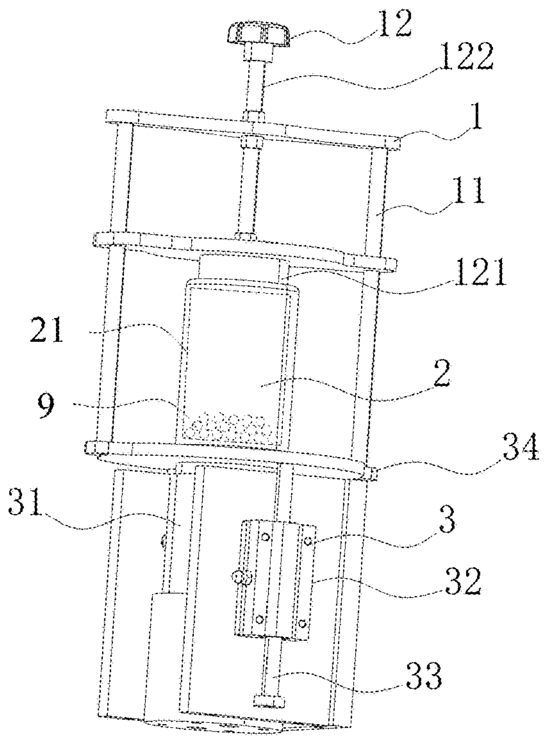
FIG. 10 is a schematic diagram of a vibrator and a container according to one embodiment of the present invention.

Preferably, as shown in FIG. 1 and FIG. 10, the vibrator 3 includes a magnetic cylinder 31, a moving plate 34, a second linear bearing 32, a guide rod 33, and a coil (not shown in the figures). The magnetic cylinder 31 and the second linear bearing 32 are both mounted on the support plate 4. The moving plate 34 is mounted to an upper end of the guide rod 33, the second linear bearing 32 is sleeved on the outside of the guide rod 33, the guide rod 33 is slidably connected to the second linear bearing 32, the coil is mounted to a lower end of the moving plate 34 and is located on an upper end of the magnetic cylinder 31, and the container 2 is fixed on the upper end of the moving plate 34. The magnetic cylinder 31 drives the coil to move after being energized, and the coil moves up and down by changing the direction of the current. The coil drives the moving plate 34 and the container 2 to vibrate up and down at high frequency. The second linear bearing 32 restricts the moving direction of the guide rod 33, improves the stability of the vertical vibration of the container 2, and also reduces the friction force of the vertical movement of the guide rod 33, thereby reducing the power consumption required for the moving plate 34 to drive the container 2 to vibrate.

In some other embodiments, the vibrator 3 may also adopt a piezoelectric vibrator, an electric vibrator, or a pneumatic vibrator, which are not particularly limited herein.

Preferably, as shown in FIG. 10, the mixing mechanism 100 is also provided with a clamping mechanism 1, which includes a support frame 11 and a clamping component 12. The clamping component 12 includes a push rod 122 and a sealing plug 121. The support frame 11 is mounted on the moving plate 34, and the sealing plug 121 is mounted to a lower end of the push rod 122. The push rod 122 is threadedly connected to the support frame 11. Rotating the push rod 122 drives the sealing plug 121 to seal an opening of the container 2. This prevents powder material from splashing and falling from the opening of the container 2 when the container 2 is vibrated by the vibrator 3.

In some embodiments, the mixing device further includes grinding balls 9 and the container 2, the container 2 being mounted on a vibrator 3. A sealed mixing chamber 21 is formed in the container 2, and the grinding balls 9 are movably arranged within the mixing chamber 21. Specifically, the grinding balls 9 are placed inside the container 2, and under the action of the vibrator 3 and the drive unit 6, the container 2 causes the grinding balls 9 to impact the powder material within the sealed mixing chamber 21, thereby achieving grinding of the powder material.

Furthermore, the grinding balls 9 move along the axial and radial directions of the container 2, resulting in a higher mixing and grinding efficiency of the mixing device, which is 3-5 times that of traditional mechanical stirring. The mixing and grinding process does not involve mixing structures such as impellers, avoiding the adhesion of powder materials, which ensures the purity of the powder material and avoids waste. Since there is no traditional stirrer, the mixing device consumes less energy during operation, reducing energy consumption by approximately 30%. Traditional mixing device can only be used for one purpose, while this device can be used for two purposes, both for mixing and grinding, achieving dual functionality.

The present invention also provides a mixing method for a mixing device, including the following steps:

Step one: the container 2 containing the powder material is mounted onto the vibrator 3.

Step two: the vibrator 3 is started, the vibrator 3 drives the container 2 to move up and down, and the powder material in the container 2 moves up and down to mix.

Step three: the support plate 4 is vertically movable on the stop support 8.

The drive unit 6 abuts against the side portion of the support plate 4. In the first direction, the adjuster 5 adjusts the contact point 50 to the first movement position. In the non-natural state, the output end of the drive unit 6 drives the side of the support plate 4 to move continuously, and the contact point 50 rotates and moves continuously.

Through the aforementioned mixing method, the powder material can be mixed vertically within the container 2. By adjusting the adjuster 5 to act on the position of the contact point 50 in the first direction, the contact point 50 is placed in the first movement position, and the support plate 4 is in a non-natural state. The support plate 4 forms the included angle 53 with the horizontal plane. The joint component 520 is in sliding cooperation with the outer edge of the support plate 4, achieving the mixing of the powder material in the side of the container 2 towards the center of the container 2. The use of two distinct mixing methods achieves high-frequency mixing of the powder material and improves the mixing efficiency of the powder material.

Preferably, the mixing method further includes the following steps:

- the first adjustment assembly 51 is used to adjust the sliding shaft 64 in the second direction, and drive the contact point 50 to move to the first movement position in the first direction;
- the second adjustment assembly 52 is used to adjust the sliding seat 42 in the first direction, and drive the contact point 50 in the first direction, the contact point 50 moves from the first movement position to the second movement position; and
- when the support plate 4 is supported by the stop support 8 in the natural state, there is a first height difference between the height of the support plate 4 and the first movement position, and there is a second height difference between the height of the support plate 4 and the second movement position.

Specifically, the first adjustment assembly 51 is used to adjust the sliding shaft 64 in the second direction. During the movement of the sliding shaft 64, the contact point 50 moves in the first direction, indirectly adjusting the position of the contact point 50 in the first direction, so that the contact point 50 moves to the first movement position. The second adjustment assembly 52 is used to continue adjusting the sliding seat 42 in the first direction to further adjust the position of the contact point 50 in the first direction, so that the contact point 50 moves from the first movement position to the second movement position. Through the secondary adjustment, the moving range of the contact point 50 in the first direction is further increased, so that the contact point 50 has different height positions. Moreover, the first adjustment mode is indirect adjustment, and the second adjustment mode is active adjustment. The use of two completely different adjustment modes increases the flexibility of adjustment.

Preferably, the first adjustment rod 511 is rotated, and the first adjustment rod 511 drives the moving block 512 to move the sliding shaft 64 back and forth in the second direction, adjusting the position between the sliding shaft 64 and the rotary shaft 63, so that the contact point 50 moves to the first movement position. The second adjustment rod 523 is rotated, and the second adjustment rod 523 drives the first connecting sleeve 521 to move up and down in the first direction, so that the contact point 50 moves from the first movement position to the second movement position. Specifically, by rotating the first adjustment rod 511 clockwise or counterclockwise, the first adjustment rod 511 drives the sliding shaft 64 to move back and forth in the second direction through the moving block 512, thereby adjusting the vertical movement of the contact point 50 to satisfy that the contact point 50 has the first movement position. By rotating the second adjustment rod 523 clockwise or counterclockwise, the second adjustment rod 523 drives the first connecting sleeve 521 to move up and down, driving the sliding seat 42 to move up and down in the first direction, thereby adjusting the vertical movement of the contact point 50 to satisfy that the contact point 50 has the second movement position.

Preferably, the mixing method further includes the grinding balls 9 moving up and down, radially, and at high speed within the container 2, with the grinding balls 9 impacting and crushing the powder material within the container 2. Specifically, for example, by placing the grinding balls 9 inside the container 2, the grinding balls 9 follows the movement of the container 2, and the grinding balls 9 can achieve a grinding effect inside the container 2. Therefore, the mixing method can simultaneously have the functions of mixing and grinding, further realizing a dual-purpose machine.

When referring to drawings, new features are being described. To avoid repetitive references to drawings that lead to insufficiently concise descriptions, features already described are not individually referenced in the drawings, provided the description is clear.

The object of the above embodiments is to provide an exemplary demonstration and derivation of the technical solutions of the present invention, thereby offering a complete description of the technical solutions, the objects, and the effects of the present invention. It aims to facilitate a more thorough and comprehensive public understanding of the disclosed content of the present invention. These embodiments shall not be construed as limiting the protection scope of the present invention.

The above embodiments are not intended to be exhaustive listings of the present invention. Numerous other embodiments not explicitly listed may also exist. Any modifications or substitutions made without departing from the spirit of the invention shall also fall within the scope of protection of the present invention.

What is claimed is:

1. A mixing mechanism, comprising a support plate, a stop support, a support platform, and a drive unit; wherein the first end of the stop support is mounted on the support platform, the support plate is mounted on a second end of the stop support, and the support plate is arranged above the support platform;

- wherein the drive unit is mounted on the support platform, with an output end of the drive unit in movable engagement with the support plate; a contact point exists between the drive unit and the support plate, and the contact point is offset from a center of the support plate;
- the drive unit includes an adjuster that acts on a position of the contact point in a first direction; the contact point has at least a first movement position in a first direction; and when the support plate is supported by the stop support in a natural state, a height difference exists between a height of the support plate and the first movement position;
- the mixing mechanism further comprises a guide rail, a sliding seat, a first pulley, and a second pulley; the guide rail is mounted on a lower surface of the support plate and extends circumferentially around the support plate;

the sliding seat is mounted on the second end of the joint component; the first pulley and the second pulley are mounted on the sliding seat; the guide rail is arranged between the first pulley and the second pulley, and is slidably connected to the first pulley and the second pulley respectively; and a connecting rod is fixedly disposed under the sliding seat; the drive unit has a sliding shaft and a joint component; a first end of the connecting rod is fixed to the joint component, and a second end of the sliding shaft is movably engaged with the joint component.

2. The mixing mechanism according to claim 1, wherein the drive unit comprises a drive component, a rotary shaft, a sliding shaft, and a joint component; the drive component is mounted on the support platform; a first end of the rotary shaft is connected to an output end of the drive component, a second end of the rotary shaft and the sliding shaft are sleeved with each other; a length direction of the rotary shaft intersects with a length direction of the sliding shaft; and the adjuster is provided with a first adjustment assembly mounted on the rotary shaft and engaged with the first end of the sliding shaft; the second end of the sliding shaft is movably connected to a first end of the joint component, a second end of the joint component is in rolling connection with the support plate; and in a second direction, the sliding shaft is slidably connected to the rotary shaft.

3. The mixing mechanism according to claim 2, wherein the first adjustment assembly comprises a first adjustment rod, a moving block, and a support block, a first end of the moving block is sleeved outside and rotatably connected to the sliding shaft; in the second direction, the sliding shaft abuts against the moving block;

a first end of the support block is mounted on the rotary shaft; a second end of the support block is sleeved on the outside of the first adjustment rod; a first end of the first adjustment rod is slidably connected to the support block; and a second end of the moving block is sleeved on the outside of the first adjustment rod, and a second end of the first adjustment rod is threadedly connected to the moving block.

4. The mixing mechanism according to claim 1, wherein the adjuster is provided with a second adjustment assembly; the second adjustment assembly comprises a second adjustment rod, a first connecting sleeve, and a second connecting sleeve; a first end of the first connecting sleeve is in rolling connection with the support plate, a first end of the second adjustment rod is movably connected to a second end of the first connecting sleeve, a second end of the second adjustment rod is threadedly connected to a first end of the second connecting sleeve, and a second end of the second connecting sleeve is mounted on the output end of the drive unit.

5. The mixing mechanism according to claim 1, wherein the adjuster comprises a first adjustment assembly and a second adjustment assembly; the drive unit comprises a drive component, a sliding shaft, a rotary shaft, and a joint component; the drive component is mounted on a support platform, a first end of the rotary shaft is mounted on the output end of the drive component; a second end of the rotary shaft is sleeved with a first end of the sliding shaft; in a second direction, the sliding shaft is slidably connected to the rotary shaft; and a second end of the sliding shaft is movably engaged with a first end of the joint component; the first adjustment assembly is mounted on the rotary shaft and engages with the sliding shaft; a second end of the joint component is connected to a first end of the second adjustment assembly, and a second end of the second adjustment assembly is in rolling connection with the support plate.

6. The mixing mechanism according to claim 1, wherein the stop support comprises at least three springs, the three springs are arranged circumferentially around the support plate, two ends of each of the springs are respectively mounted to the support plate and the support platform, and the mounting points of the springs are offset from the center of the support plate.

7. A mixing device, comprising a vibrator and a mixing mechanism as described in claim 1, wherein the vibrator is mounted on the support plate of the mixing mechanism and arranged near the center of the support plate.

8. The mixing device according to claim 7, comprising grinding balls and a container, wherein the container is mounted on the vibrator, a sealed mixing chamber is formed inside the container, and the grinding balls are movably disposed within the mixing chamber.

* * * * *